(12) United States Patent
Smith et al.

(10) Patent No.: US 6,311,324 B1
(45) Date of Patent: Oct. 30, 2001

(54) SOFTWARE PROFILER WHICH HAS THE ABILITY TO DISPLAY PERFORMANCE DATA ON A COMPUTER SCREEN

(75) Inventors: Kevin J. Smith, Cupertino; K. Sridharan, San Jose, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/478,974

(22) Filed: Jun. 7, 1995

(51) Int. Cl.⁷ ........................................................ G06F 9/44
(52) U.S. Cl. ................................................................ 717/4
(58) Field of Search .................................... 395/700, 701, 395/702, 703, 704, 705, 706, 708, 709, 650

(56) References Cited

U.S. PATENT DOCUMENTS

| | | | |
|---|---|---|---|
| 5,175,856 | * 12/1992 | Van Dyke et al. | 395/700 |
| 5,179,702 | * 1/1993 | Spix et al. | 395/650 |
| 5,187,789 | * 2/1993 | O'Hair | 395/700 |
| 5,287,511 | * 2/1994 | Robinson et al. | 395/700 |
| 5,432,932 | * 7/1995 | Chen et al. | 395/650 |
| 5,452,457 | * 9/1995 | Alpert et al. | 395/700 |
| 5,465,258 | * 11/1995 | Adams | 395/700 |
| 5,473,773 | * 12/1995 | Aman et al. | 395/650 |
| 5,481,708 | * 1/1996 | Kukol | 395/700 |

* cited by examiner

Primary Examiner—Kakali Chaki
Assistant Examiner—Todd D. Ingberg
(74) Attorney, Agent, or Firm—Blakely, Sokoloff, Taylor & Zafman LLP (57) ABSTRACT

A C-language program performance tuning advisor that helps a systems analyst to improve the performance of an application. The tuning advisor identifies critical regions (hot spots) of an application, and helps the user to analyze the region. Once the region has been identified and analyzed, the tuning advisor advises the user on how to rewrite the original C code to improve the performance of the overall application. When the compiler needs to be conservative to be semantically correct, the tuning advisor suggests code modifications to remove the semantic constraints. The tuning advisor recognizes most commonly used C code patterns which if modified could improve the performance.

28 Claims, 3 Drawing Sheets

SOFTWARE PROFILER WHICH HAS THE ABILITY TO DISPLAY PERFORMANCE DATA ON A COMPUTER SCREEN

BACKGROUND OF THE INVENTION

1. Field of the Invention

The present invention is related to computer systems and more specifically to a program development tool for automatically analyzing programming code and providing a programmer with advice with respect to modifications that could improve program performance.

2. Prior Art

The IBM personal computer (PC) architecture has become a de-facto standard for personal computers over the past decade. The main hardware part of the computer is a central processing unit (CPU) which is an INTEL Pentium™ brand microprocessor, random access memory (RAM), and microprocessor support chips. The IBM PC architecture uses a MICROSOFT brand disc operating system (DOS) as the software program that controls the overall operation of the computer.

Application programs, programs that perform a particular task such as word processing, are developed by many different vendors for use with the IBM personal computer. Software application programs that are written for the Microsoft DOS, Microsoft NT, Microsoft Windows or UNIX operating system by application programmers use a programming language that results in lines of code, called source code. Source code is programming instructions, written by a user, that instruct a computer to perform a series of functions. Since the actual computer logic cannot understand source code statements, the source code must be changed to more precise statements, called object code, that the computer can understand.

An assembler or compiler translates source code into object or assembly language code. Most programmers do not write programs directly in assembly language because to do so would be very tedious, requiring many lines of code to perform a simple task that in source code would require only a simple statement.

The object code created by an assembler or compiler consists of lines of code that are machine instructions, instructions that are understood by a particular computer machine's central processing unit (CPU) and that will run on that CPU. A compiler will make certain assumptions in order to preserve program semantics due to restrictions put on it by the programming language that the user has used to create the source code.

After an application program is written it is translated by a compiler into object code and is run on the microprocessor. Problem areas in the program may appear where the central processing unit (CPU) has spent a large amount of processing time. For example a large number of cache misses, branch mis-predicts, etc. Currently, engineers familiar with the microprocessor and the source code language analyze the source code at the problem areas and recommend changes that could improve the performance of the particular microprocessor. In the past, automatic tools have been available that suggest improvements of various kinds. The shortcoming is that these prior tools are labor intensive, requiring the services of a systems analyst to work with a user on problem areas targeted by the tool. It is therefore desirable to have an automated tool that a application program developer can use without the need for the services of a systems analyst.

SUMMARY OF THE INVENTION

Briefly, the invention is a program tuning advisor method embodied in a computer system including a central processing unit (CPU) and a number of program modules running on the CPU. Code samples are collected and analyzed to identify hotspots in the code samples. A graphical view of CPU time spent in each module is displayed in a window. At the request of a user, a graphical view of the hotspots is displayed in another window. By clicking on a hotspot, a user causes a graphical view of a section of code related to a particular one hotspot selected by a user from the second graphical view to be displayed. Then, optimization advice for the section of code is displayed.

The program tuning advisor analyzes program source code and suggests improvements to the source code that could improve the program in areas of the program where a CPU spends a lot of execution time. Since the advisor only suggests improvements for execution hotspots, this focuses the advice to the places where it has the greatest impact.

An advantage of this invention is that the programming tool is connected to a profiler so that suggestions are only made on small parts of the program. This prevents information overload where the suggestions become overwhelming.

An advantage of this invention is that the tool also suggests changes which cannot automatically be done by a compiler since they could be unsafe due to language semantics. Yet the tool of this invention can recommend such changes and it is up to the program tuner to verify that the changes are safe in the particular context. Typically, a change can safely be made because the original algorithm could have been expressed in multiple ways, one of which is the recommended change. The programmer was probably unaware of the performance difference between the original code and recommended code and had arbitrarily chosen the original code.

An advantage of this invention is that the tool analyzes only the sections of users' code that are based on hotspots.

An advantage of this invention is that the tool gives advice on the necessary source code modifications that would improve the performance of the application on the target processor.

An advantage of this invention is that the tool gives advice based on optimizations that are not possible in traditional optimizing compilers, due to the general assumptions forced by the programming language.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

C is a high-level programming language widely used to create application programs for the IBM personal computer.

C program code is complied by a C compiler. The present invention is embodied in a C Performance Tuning Advisor (CTA). The C Tuning Advisor helps a user to improve the performance of an application. A tuning program, of which CTA is a part, identifies critical regions (hot spots) of an application, and helps the user to analyze the region. Once the region has been identified and analyzed, the program advises the user on how to rewrite the original C code to improve the performance of the overall application.

However advanced a compiler may be, there are limitations to what a C compiler can do, mainly due to the pointer semantics (the logical meaning of a statement) of C. When the compiler needs to be conservative to be absolutely safe, CTA suggests code modifications to remove the conservative assumptions. CTA recognizes most commonly used C code patterns which could be slightly modified to improve the performance.

Performance Tuning Methodology

Figure 1:
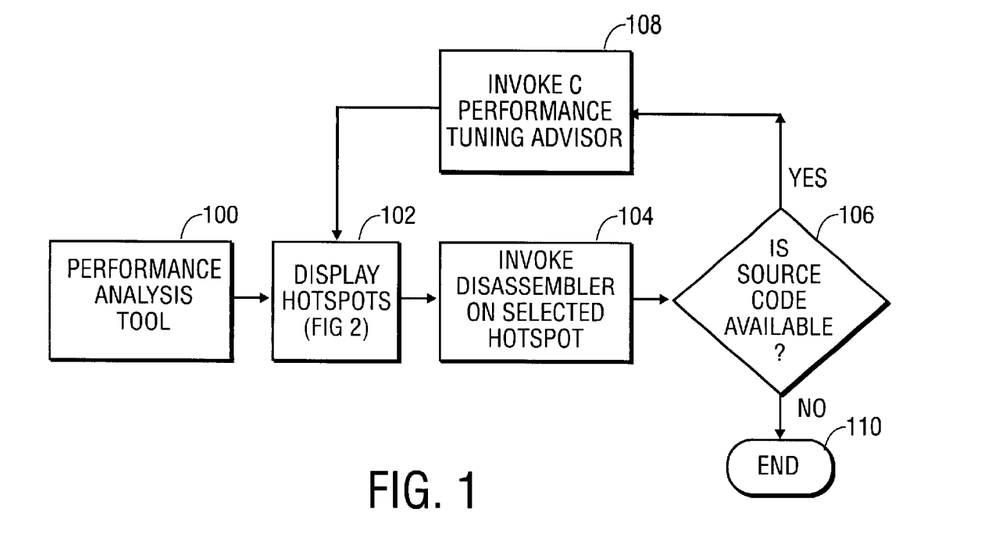
FIG. 1 is a diagram of a performance tuning method in accordance with the present invention.
Figure 2:
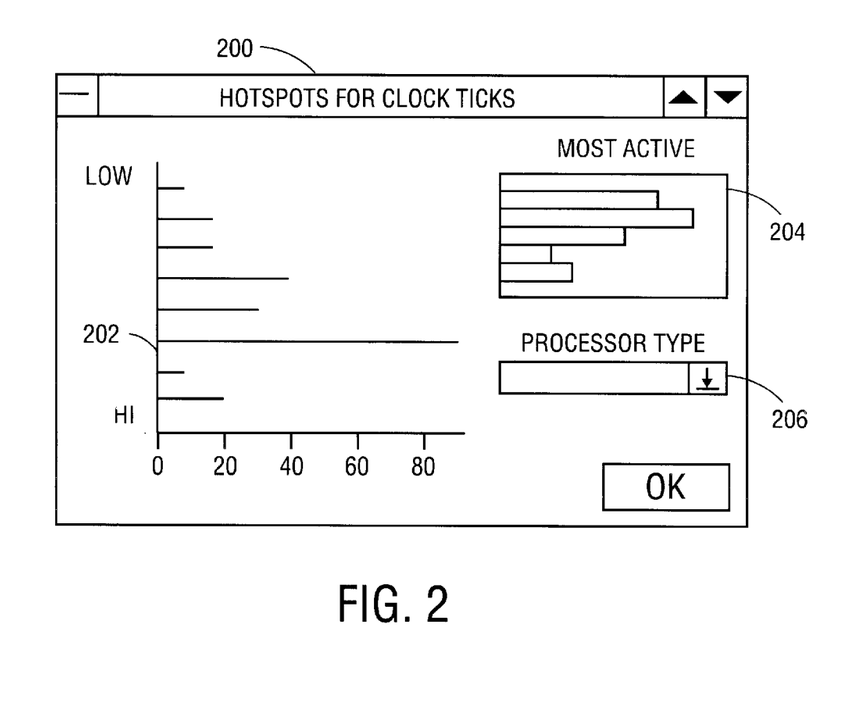
FIG. 2 is a representation of computer display screen upon which a hotspot window is displayed.

As shown in FIG. 1, an application is analyzed (100) with a performance analysis tool, and critical areas or hot spots in the program are identified. As illustrated in FIG. 2, these hot spots are displayed (102) to the user in a graphical form in a window of the MICROSOFT WINDOWS graphical interface. From this window, the user can invoke a source window. The source window displays a text form view of the source code. A dis-assembler is automatically invoked (104) on the object code corresponding to a hot spot selected by the user. After text form view, if source code is available (106) and the user requests it, CTA is invoked on the hot spot (108), and this cycle is repeated until the user is satisfied with the performance of the application. If source code is not available (106) the process ends (110).

In this invention, several graphical windows are displayed in the MICROSOFT WINDOWS graphical interface environment for the IBM Personal Computer. These windows are Project Window, Modules Report Window, Hotspots Window, Source Window and C Tuning Advisor Window. These windows are described in the following sections.

Project Window

A project window allows a user to configure a monitoring session, monitor an application, and analyze the samples collected. It allows a user to monitor an application in three different modes: manual mode, recorded script mode, and keyboard script mode. Each sampling session is treated as a project. From the project window, a user can create a new project, save a project, or open an existing project, in a manner consistent with the WINDOWS graphical interface environment.

Modules Report Window

A modules report window displays a graphical view of the CPU time spent in each module or application during the sampling phase. From this window, a user can invoke a Hotspots window, shown in FIG. 2.

Hotspots Window

Refer to FIG. 2. The hotspot window (200) displays a graphical view of every hotspot in a module. The graph (202) in this window is a representation of CPU utilization (plotted on X-axis) for each memory location (plotted on Y-axis). The most active modules are plotted in the small graph (204). The processor type is displayed in a drop-down list box (206). From this hotspot window, a user can invoke a source window by moving a cursor to one hotspot and clicking on that hotspot with a mouse pointing device.

Source Window

Depending upon a view option selected, a source window displays one of the following outputs as lines of code: source code output, assembly code output, or mixed source/assembly code output. From this source window, a user can invoke a C tuning advisor window by moving a cursor to select (highlight) lines of C code and clicking on that selection with a mouse pointing device.

C Tuning Advisor Window

A C tuning advisor (CTA) window displays optimization advice for a selected section of C code. A user can modify the selected C-code in accordance with the advice given, recompile the program, run the application again and monitor the result. This process is repeated until satisfactory results are achieved.

CTA Input

CTA's input is a source file and a range of line numbers where a hot spot is present. CTA can also utilize additional information from performance analyzers, which can give processor event information (such as branch mispredictions), and memory pattern recognizers, which can recognize memory patterns from an execution trace, analyze the CPU cache behavior, and suggest possible transformations to improve the performance.

CTA can detect a range of line numbers on which to give advice, even when a user double clicks on a single line of code, by examining the control flow structure of the program. So CTA can automatically detect the context on which to give advice when the user just double clicks on a single source code line containing the hotspot.

Program Flow

Figure 3:
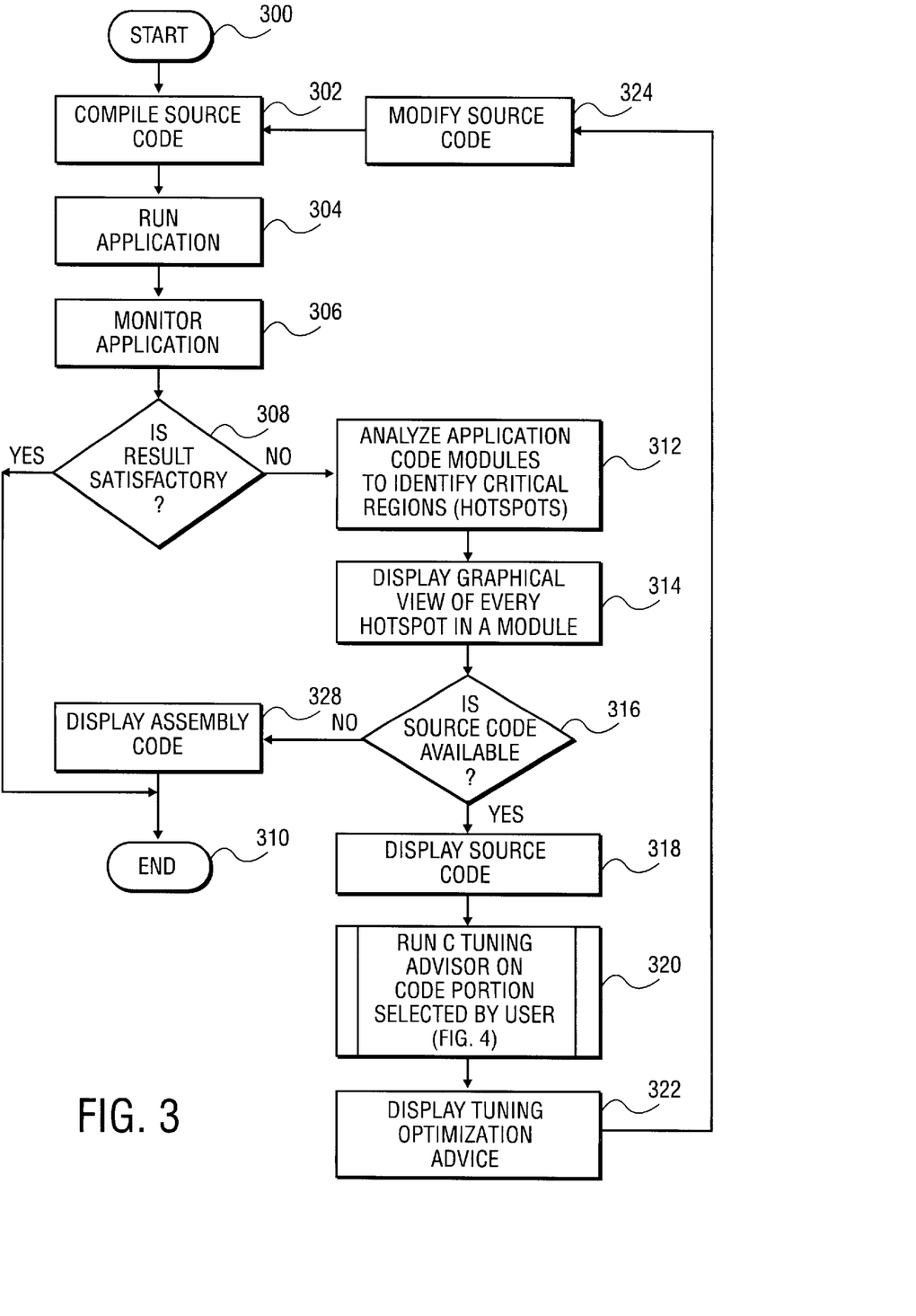
FIG. 3 is a flow chart of the operation of tuning program in which the present invention is embodied; and, FIG. 4 is a flow chart of the operation of the C tuning advisor portion of the program of FIG. 3.
Figure 4:
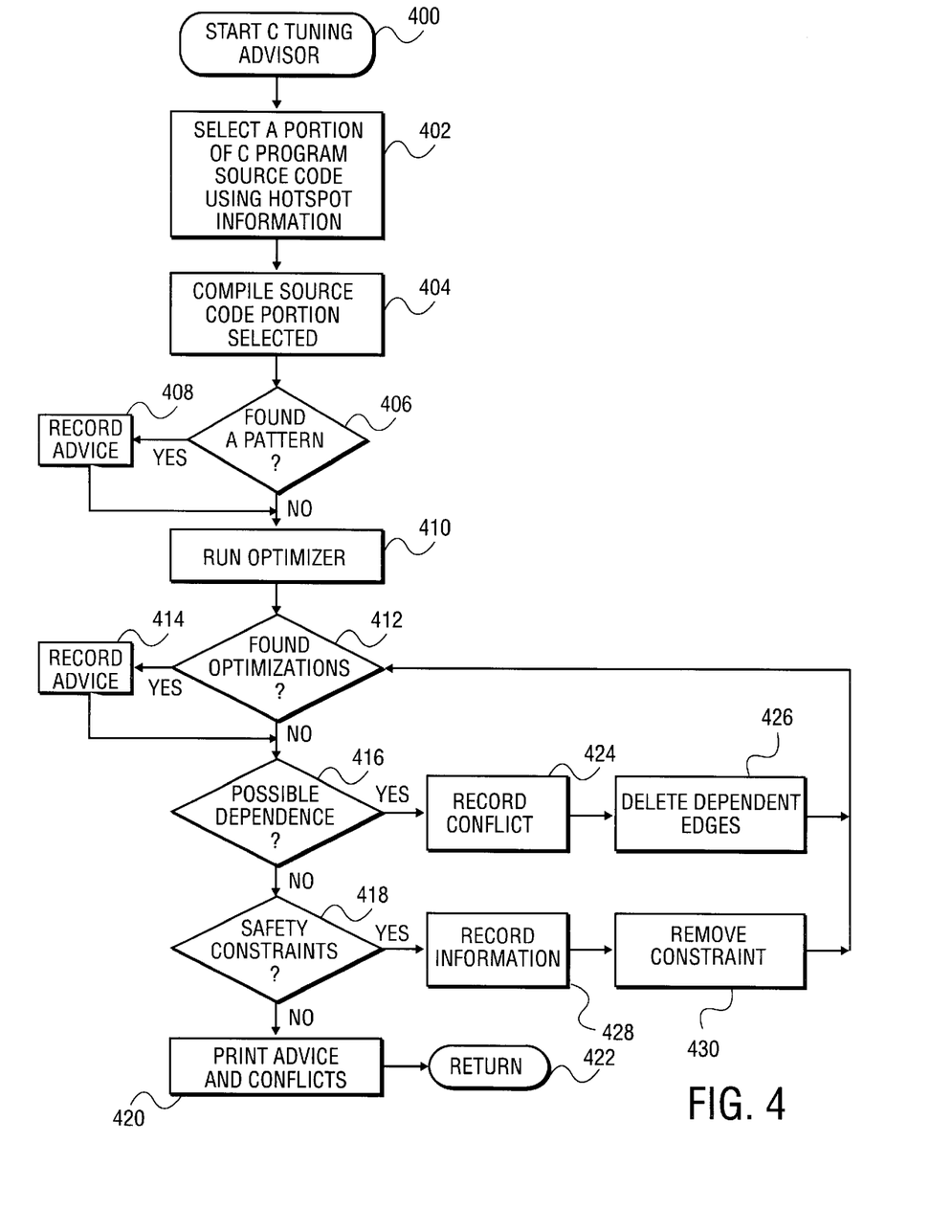

Refer to FIG. 3 and FIG. 4, which comprise a flow chart of the operation of the present invention. In FIG. 3, the process begins at Start (300). The user compiles source code (302) and runs the application (304). The user monitors the application (306). If the application runs properly and the result is satisfactory (308), then the path YES is taken to end the process (310). If application does not run properly and the result is not satisfactory (308), then the path NO is taken. If NO, a tuning program proceeds to analyze application code modules to identify critical regions (312) called hotspots, and displays a graphical view of every hotspot in a module (314). The display window is shown in FIG. 2. A test is made to see if source code is available (316). If NO, then assembly code is displayed (328). If YES, then source code is displayed (318). The C tuning advisor then runs on a code portion selected by the user (320). The C tuning advisor flow is shown in FIG. 4. After return from the C tuning advisor, the program displays tuning optimization advice (322). The user uses this advice to modify the source code (324). The user then again compiles the source code (302) and repeats the process until satisfactory program operation is achieved.

Refer to FIG. 4 which is a flow chart of the operation of the C tuning advisor portion of the method of FIG. 3. The C tuning advisor is started (400). Using hotspot information selected by the user, the program selects a portion of C program source code (402). The program then compiles the source code portion selected (404).

A test is made to determine if a a data type optimization is possible (405). If YES, then the program records advice (407). If NO, then a test is made to determine if a pattern is found (406). If YES, then the program records advice (408). If NO, then an optimizer is run (410). A test is made to determine if an optimization is found (412). If YES, then the program records advice (414). If NO, then a test is made for possible dependence (416). If YES, then the program records the conflict (424), deletes dependent edges (426) and runs the optimizer again. If NO at decision (416), then test is made for safety constraints (418). If YES, then the program records the information (428), removes the constraint (430), and runs the optimizer again. If NO, then the program records and prints the advice and conflicts (420) and returns (422) to the flow of FIG. 3.

CTA Functionality (Transformations)

As shown in FIG. 4, CTA compiles the source code, and analyzes, in detail, the source code in the line number range given by a user as input. CTA recognizes data type optimizations (405), recognizes a set of performance inhibiting code patterns (406) and adds to the list of suggestions for this program (407, 408). CTA observes the compiler optimizations (410, 412) and suggests (414) coding changes that will ensure this optimization in many off-the-shelf compilers. When a compiler is forced to make a conservative assumption to ensure safety, CTA removes the assumption (424, 428) and observes the effect. If removing this assumption will improve the performance, CTA adds coding change suggestions that will expose this optimization.

The following is a list of features that are unique to CTA:
1. CTA analyzes only the sections of users' code that are based on hotspots.
2. CTA gives advice on the necessary source code modifications that would improve the performance of the application on the target processor.
3. CTA gives advice based on optimizations that are not possible in traditional (automatic) optimizing compilers, due to the conservative safety assumptions forced by the programming language.

CTA uses the following techniques for giving advice on program transformations:
1. CTA recognizes some data type optimizations, and suggests transformations to reduce instructions.
2. CTA recognizes some known patterns that can cause performance problems, and suggests modifications that are known to be effective.
3. CTA captures the effect of advanced optimizations performed by compiler, and proposes code modifications that would expose this effect for any compiler.
4. CTA overrides a Possible Dependence Edge (after making a note of it), and repeats parts of step 3 when these dependences prevent optimizations.
5. CTA overrides Compiler's Conservative Assumptions about safety, modifies the data for optmization and repeats parts of step 3 when these assumptions prevent optimizations.

CTA Transformation Examples

The following list gives a representative sample of the transformations suggested by CTA. Each is described in the following paragraphs along with an example.
1. Short To Integer
2. Post Increment/Decrement of a Loop Test Variable
3. Loop Invariant Motion
4. Loop Invariant Motion with Conflicts
5. Instruction Scheduling
6. Loop Unrolling
7. If-Switching
8. Loop Rerolling
9. Logical ANDS to Bitwise ANDS
10. Float to Integer
11. Logical OR Conversion
12. Call to Error in a Stream of Code There are four types of transformations that are used in the present invention, and the following examples cover all four.

Data type optimizations: Short to Int, Float To Int are such transformations.

Pattern Matching: Logical Or Conversion is an example of this.

Optimization in the presence of Safety Assumptions: Logical ANDs & bitwise ANDs is an example.

Optimization in the presence of dependence: Loop InvariantMotion with Conflicts is an example Short To Integer A variable declared as short is used as a loop index variable. In a 32-bit Intel processor, additional instructions will be generated to extend the variable to 32 bits. These additional instructions increase the loop overhead.

If the variable declaration is changed from short to integer, the compiler does not generate any additional shifts to extend the integer variable to 32-bits. As a result, fewer instructions are executed within the loop

PROGRAM EXAMPLE 1

Short to Integer

| Original Code | Optimized Code |
| --- | --- |
| void this_routine( <br> float *a, <br> float **b, <br> int n) <br> { <br>   short i; <br>   short k = n; <br>   for(i=0; i<k; i++) <br>   { <br>     a[i]+=b[0][i]; <br>   } <br> } | void this_routine( <br> float *a, <br> float **b, <br> int n) <br> { <br>   int i; <br>   int k = n; <br>   for(i=0; i<k; i++) <br>   { <br>     a[i]+=b[0][i]; <br>   } <br> } |

Post Increment/Decrement of a Loop Test Variable

The loop index variable is tested and incremented or decremented inside the loop conditional expression. Two separate registers are used to store the current and the future values of the variable. Using two registers for computing the value of one variable reduces the number of free registers available.

In the example given below, loop index variable lim is both tested and decremented in the loop conditional expression. Two registers are used to store the current and the future values of lim. Having two instructions in a conditional expression increases the loop overhead. The C Tuning Advisor will advise the user to not combine two operations in a loop conditional expression. It is better to modify the loop index variable after testing the loop conditional expression.

PROGRAM EXAMPLE 2

Post Decrement of a Loop Test Variable

| Original Code | Optimized Code |
| --- | --- |
| void test_ post( <br> int n, <br> int *a, <br> int b) <br> { <br>   int lim = 0; <br>   lim = n; <br>   while(lim--) <br>   { | void test_ post( <br> int n, <br> int *a, <br> int b) <br> { <br>   int lim = 0; <br>   lim = n; <br>   while(lim) <br>   { |

| Original Code | Optimized Code |
| --- | --- |
| ```
    *a += b;
  }
}
``` | ```
    *a += b;
    lim--;
  }
}
``` |

Loop Invariant Motion

A pointer variable is used inside the loop. The target value changes but the value of the pointer itself does not change inside the loop. Using a loop invariant pointer generates redundant store to memory operations.

In the example below, a pointer variable *a which does not change the location to which it is pointing is stored and used for computation inside the loop. Redundant store instructions are generated for the loop invariant pointer variable.

The C Tuning Advisor will suggest the following:

1. Assign the target value to a temporary register variable.
2. Use the register variable instead of the pointer inside the loop.
3. Update the target value with the register variable after the loop.

This will result in a code sequence which will have no redundant memory allocation instructions within the loop.

PROGRAM EXAMPLE 3

Loop Invariant Motion

| Original Code | Optimized Code |
| --- | --- |
| ```
void test_post(
    int n,
    int *a,
    int b)
{
  int lim=0;
  lim=n;
  while (lim--)
  {
    *a += b;
  }
}
``` | ```
void test_post(
    int n,
    int *a,
    int b)
{
  int lim=0;
  register int tempa;
  lim = n;
  tempa =*a;
  while (lim--)
  {
    tempa += b;
  }
  *a = tempa;
}
``` |

Loop Invariant Motion with Conflicts

A loop invariant pointer variable is used for computation inside the loop. This generates redundant store to memory operations. The pointer does not change; but the target value is added and loaded into consecutive memory locations of an array. Using a loop invariant variable generates redundant store to memory operations.

In the example below, the pointer variable *a does not change the location to which it is pointing but is stored and used for computation inside the loop. Assuming that the pointer may be pointing to one of the elements of the array, the compiler stores the variable and loads it back again for every iteration of the loop. This generates several redundant store instructions within the loop.

CTA will advise the user to do the following:

1. Assign the memory location of the pointer to a register variable.
2. Use the register variable instead of the pointer inside the loop.
3. Update the target value from the register variable after the loop.

This results in fewer instructions being executed within the loop. Using the register variable instead of the pointer inside the loop indicates explicitly to the compiler that there is no conflict between the pointer and the range of values in the elements of the array. This prevents the compiler from generating redundant store instructions inside the loop.

PROGRAM EXAMPLE 4

Loop Invariant Motion with Conflicts

| Original Code | Optimized Code |
| --- | --- |
| ```
void this_routine(
    float *a,
    float **b,
    int n)
{
  int i;
  int k = n;
  for(i=0; i<k; i++)
  {
    *a += b[0][i];
  }
}
``` | ```
void this_routine(
    float *a,
    float **b,
    int n)
{
  int i;
  int k = n;
  register float tempa;
  tempa = *a;
  for(i=0; i<k; i++)
  {
    tempa += b[0][i];
  }
  *a = tempa;
}
``` |

Instruction Scheduling

The assembly language instructions generated for the source code cannot be reordered to improve instruction scheduling. Instructions with dependencies cannot be moved around and reordered by the compiler. This results in inefficient instruction scheduling.

The following statement:

*a+++=b[0][n];

may produce the following code:

load a load b[0][n]

add a+b[0][n]

store a incr a

If the following code is present, the compiler will have a hard time of scheduling:

*a+++=b[0][n];

*a+=b[0][n-1];

If the compiler can move the load instructions past the store instructions, there could be better instruction scheduling. But, since a pointer variable *a is used inside the expression and can be pointing to b[0][n], the compiler does not move the load instructions past the store instructions. This results in inefficient instruction scheduling.

CTA will advise the user to do the following:

Modify the source code in order to generate independent instructions that can be reordered by the compiler.

Use temporary variables to explicitly state to the compiler that there are no dependencies between the instructions.

The following code sequence will be result of these code modifications:

temp1=*a+b[0][n];

temp2=*(a+1)+b[0][n-1];

```
*a++=temp1;
*a=temp2;
```
This will result in more efficient instruction scheduling and pairing.

PROGRAM EXAMPLE 5

Instruction Scheduling

| Original Code | Optimized Code |
|---|---|
| ``` void this_routine( float *a, float **b, int n) { *a++ += b[0][n]; *a += b[0][n-1]; } ``` | ``` void this_routine( float *a, float **b, int n) { register float temp1; register float temp2; temp1 = *a + b[0][n]; temp2 = *(a+1) + b[0][n-1]; *a++ = temp1; *a = temp2; } ``` |

Loop Unrolling

The loop generates instructions that do not allow efficient instruction scheduling and pairing. The instructions generated are few and provide little scope for the Pentium™ processor to schedule and pair them in its dual pipelines. As a result, several redundant clock cycles are generated to execute these instructions.

In the example below, the loop index variable is incremented by one every time the loop executes. This code generates only a few machine instructions. The few instructions give little scope for the Pentium™ processor to reorder, schedule, and pair the instructions in its dual pipelines.

CTA will advise the user to unroll the loop by a certain amount, which is determined to be optimal for the loop for the Pentium™ architecture. This will provide the optimal scheduling and register allocation balance to this loop. Unrolling can be is done as follows:

Replicate the body of the loop.

Adjust the index expression if needed.

Adjust the loop iteration's control statements.

PROGRAM EXAMPLE 6

Loop Unrolling

| Original Code | Optimized Code |
|---|---|
| ``` void test_it( int *a, int* c, int n) { int i; for(i=0;i<n;i++) a[i] = c[i]; } ``` | ``` void test_it( int *a, int *c, int n) { int i; for(i=0;i<n-(n%3);i+=3) { a[i]=c[i]; a[i+1]=c[i+1]; a[i+2]=c[i+2]; } for(i;i<n;i++) a[i] = c[i]; } ``` |

If-Switching

An if statement with a loop invariant condition is used inside a loop. Every time the loop executes, the if condition is evaluated and the branch code is executed. This generates several redundant instructions.

In the example given below, the value of the variable in the if conditional expression putp==1 does not change inside the for loop so the if condition is loop invariant. Since the if statement is inside the loop, it is evaluated every time the for loop is executed. This generates several redundant instructions and increases the loop overhead.

CTA will advise the user to move the if statement outside of the for statement, by doing the following:

1. Move the if statement out of the loop.
2. Copy the loop into the two branches of the if-else statement.

This will result in the if statement becoming the main controlling statement. The if condition is evaluated only once. Depending upon how the condition evaluates, one of the loops in the if-else branch statements is executed. Since fewer statements are executed within the loop, the loop overhead is significantly reduced.

PROGRAM EXAMPLE 7

If-Switching

| Original Code | Optimized Code |
|---|---|
| ``` extern int putp; void test_if( int *a, int *p, int *q, int n) { int i; for(i=0; i<n; i++) if (putp==1) a[i] = p[i]+q[i]; else a[i] = p[i]-q[i]; } ``` | ``` extern int putp; void test_if ( int *a, int *p, int *q, int n) { int i; if (putp==1) for(i=0; i<n; i++) a[i] = p[i] + q[i]; else for(i=0; i<n; i++) a[i] = p[i]-q[i]; } ``` |

Loop Rerolling

A loop has been manually unrolled. This may result in increased register pressure in the loop on the Pentium machines, resulting in increased code to store and re-load the register values. It will be better to let a compiler (in this case, the C Tuning Advisor) decide the unrolling factor, taking into account the scheduling and register allocation issues.

In the example below, a loop has been manually unrolled. CTA will advise the user to re-roll the loop and let the compiler decide the unrolling factor.

This optimization can be contrasted with the loop unrolling example, since there, the compiler has actually determined the optimal unrolling factor for the Pentium architecture.

PROGRAM EXAMPLE 8

Loop Rerolling

| Original Code | Optimized Code |
|---|---|
| ```void    test_it(
      int *a,
      int *c)
{
int i;
for(i=0; i<100; i+=5){
      a[i]   = c[i] ;
      a[i+1] = c[i+1];
      a[i+2] = c[i+2];
      a[i+3] = c[i+3];
      a[i+4] = c[i+4];
      }
}``` | ```void    test_it(
      int *a,
      int *c)
{
int i;
for(i=; i<100; i++){
      a[i] = c[i] ;
      }
}``` |

Logical ANDS to Bitwise ANDS

A logical AND (&&) operation is used inside a loop. This operation causes branching in the generated code. Branching inside a loop increases the loop execution time.

In the example below, a logical && operation is used for testing the pointer value for NULL before accessing it. If the user knows that a NULL pointer reference will not happen in this code, then it is possible to change the code to use a bitwise AND operation.

CTA will advise the user to use AND (&) operation instead of && operation, if it is safe to do so.

If this code is in a loop, the change will result in no branching code inside the loop. The code will execute much faster.

Programmers are cautioned to replace the logical AND (&&) operator with the bitwise AND (&) operator only if the replacement can be done without problem.

PROGRAM EXAMPLE 9

Logical ANDS to Bitwise ANDS

| Original Code | Optimized Code |
|---|---|
| ```struct ent{
   struct enode *expr;
   struct ent *next;
};
extern struct ent
tbl[10][20];
void test_it{
   struct ent * p,
   int i,
   int j){
if[(p=tbl[i][j])&&(p->expr!=0)]
printf("Tested P.\n");
}``` | ```struct ent{
   struct enode *expr;
   struct ent *next;
};
extern struct ent
tbl[10][20];
void test_it{
   struct ent * p,
   int i,
   int j){
p = tbl[i][j];
if {(pl=0)&(p->expr!=0)}
   printf("Tested P.\in");
}``` |

Float to Integer

A float to integer conversion is used. In C semantics, when a float value is assigned to int, the value is truncated. On x86 processors, the instruction Fist (float to int store) has a default mode of "round to nearest," and compilers generate code to explicitly set the control word to reflect C semantics. As a result, several instructions are generated to convert the float value to integer. This increases execution time.

In the example below, the following code sequence requires a fist instruction for float to int conversion:

int num2=(int)*num;

According to C semantics, the value is truncated. On an X86 processor, the instruction Fist (float to int store) has a default mode of "round to nearest." The compiler generates several instructions to explicitly set the control word to reflect C semantics. This code takes more execution time.

The C Tuning advisor will advise the user that if the C semantics are not required and it is okay to use the "round to nearest" or other default processor modes, the float to int conversion can be replaced with in-line assembly code or an assembly macro. This will result in avoiding the control word manipulation, and fewer instructions will be generated. The code executes much faster.

PROGRAM EXAMPLE 10

Float to Integer

| Original Code | Optimized Code |
|---|---|
| ```int test_it( float *num,
            int num1)
{
int num2 = (int) *num;
int result;
result = num1+num2;
return result;
}``` | ```asm void
FloatToInt(value, num)
{
   %mem value,num;
   flds value
   fistpl num
} int test_it(
      float * num,
      int num1) {
   int num2 ;
   int result;
   FloatToInt(*num, num2);
   result = num1+num2;
   return result;
}``` |

Logical OR Conversion

A logical OR (||) operation is used to test a variable for equality with small integers. The operation generates several branches inside the code. Branching increases the program's execution time.

In the example below, the value of the variable signif is tested for a very small range of integer values (less that 16, in fact!). CTA will advise the user to replace this with a table look up algorithm, where a small table of integers have the appropriate entries set to TRUE and others set to FALSE. The entries where the value have index values corresponding to the the original integer values. i.e., if we were testing for signif==4, then testtable[4] will be TRUE.

The resulting code will have much less branch code, and the testing will be done in one small lookup. This is usually beneficial only for small ranges.

PROGRAM EXAMPLE 11

Logical OR Conversion

| Original Code | Optimized Code |
|---|---|
| ```void sub(int *, int*);
void test_it(
      int * a,
      int *b,``` | ```void sub(int *, int*);
int
testtable[16]={0,1,0,
                   0,1,0,``` |

-continued

| Original Code | Optimized Code |
|---|---|
| int signif) { | 0,1,0, |
|  | 0,1,0, |
| if (signif==1\|\|signif==4 |  |
| \|\| | 0,1,0,0}; |
| signif==7 \|\| |  |
| signif==10 \|\| | void test_it( int * a, |
| signif == 13){ | int *b, |
|  | int signif) |
| sub(a,b); | { |
| } | if(testtable[signif]) |
|  | sub(a,b); |
| else sub(b,a); | else sub(b,a); |
| } | } |

Call to Error in a Stream of Code

A call to an infrequently executed error statement is detected in the middle of a block of code. The call statement generates several machine instructions to be placed in the Pentium processor's Instruction Cache. Since these instructions take up most of the Instruction Cache, the more frequently executed code following the error statement cannot be accessed and executed immediately. This increases the program's execution time.

CTA will advise the user to move the infrequently used error statement out of the block of code.

This will result in the most frequently executed block of code remaining in the instruction cache and, ultimately, the program executes much faster.

PROGRAM EXAMPLE 12

Call to Error in a Stream of Code

| Original Code | Optimized Code |
|---|---|
| void error(char *); | void error(char *); |
| void test_it( | void test_it( |
| char *mem, | char *mem, |
| int flag) { | int flag) { |
| if (flag < 0) | if (flag < 0) goto errlab; |
| error("flag is | dummy(flag); |
| negative"); | dummy1(*mem); |
| dummy(flag); | return; |
| dummy1(*mem); | errlab; |
| return; | error("flag is |
| } | negative"); |
|  | } |

While the invention has been particularly shown and described with reference to preferred embodiments thereof, it will be understood by those skilled in the art that the foregoing and other changes in form and detail may be made therein without departing from the scope of the invention.

What is claimed is:

1. A program tuning method comprising steps of:
   A. running an application (304) which includes application code modules;
   B. monitoring said application (306) to determine if performance is satisfactory;
   C. analyzing said application code modules to identify critical regions (312);
   D. displaying a graphical view of said critical regions (314); and,
   E. running a performance tuning advisor on a portion of source code (402) using information related to one critical region selected from among said critical regions.

2. The method of claim 1 further comprising steps of:
   F. recognizing one pattern of a set of performance inhibiting code patterns with respect to said portion of source code (404); and,
   G. recording advice upon a condition that said one pattern is recognized (406).

3. The method of claim 2 further comprising steps of:
   H. running an optimizer to find an optimization upon a condition that said one pattern is not recognized; and,
   I. recording advice upon a condition that said optimization is found.

4. The method of claim 3 further comprising steps of:
   J. testing for (416) possible dependence; and,
   K. recording a conflict (424), deleting dependent edges (426) and running said optimizer again, upon a condition that a possible dependence is found.

5. The method of claim 4 further comprising steps of:
   L. testing for safety constraints (418) to find a safety constraint; and,
   M. recording information (428), removing said safety constraint (430), and running said optimizer again, upon a condition that said safety constraint is found.

6. The method of claim 1 further comprising steps of:
   F. recognizing a data type optimization (405) with respect to said portion of source code (404); and,
   G. recording advice with respect to said data type optimization (406).

7. The method of claim 6 further comprising steps of:
   H. running an optimizer to find an optimization upon a condition that said one pattern is not recognized; and,
   I. recording advice upon a condition that said optimization is found.

8. The method of claim 7 further comprising steps of:
   J. testing for (416) possible dependence; and,
   K. recording a conflict (424), deleting dependent edges (426) and running said optimizer again, upon a condition that a possible dependence is found.

9. The method of claim 8 further comprising steps of:
   L. testing for safety constraints (418) to find a safety constraint; and,
   M. recording information (428), removing said safety constraint (430), and running said optimizer again, upon a condition that said safety constraint is found.

10. The method of claim 7 further comprising steps of:
    N. recording advice and conflicts;
    O. displaying tuning optimization advice (322);
    P. modifying said source code (324) resulting in modified source code; and,
    Q. recompiling said modified source code (302).

11. The method of claim 1 further comprising steps of:
    H. testing for (416) possible dependence; and,
    K. recording a conflict (424), deleting dependent edges (426) and running said optimizer again, upon a condition that a possible dependence is found.

12. The method of claim 1 further comprising steps of:
    L. testing for safety constraints (418) to find a safety constraint; and,
    M. recording information (428), removing said safety constraint (430), and running said optimizer again, upon a condition that said safety constraint is found.

13. The method of claim 1 further comprising steps of:
    H. recording advice and conflicts;

I. displaying tuning optimization advice (322);

J. modifying said source code (324) resulting in modified source code; and

K. recompiling said modified source code (302).

14. A program tuning method comprising steps of:

A. analyzing a program with a performance analysis tool to identify critical regions in said program;

B. displaying said critical regions in a graphical form on a computer display in a manner such that said critical regions are selectable by a user;

C. displaying on said computer display a section of code corresponding to one critical region selected from among said critical areas displayed in a graphical form;

D. invoking a dis-assembler on said section of code corresponding to said one critical region resulting in lines of source code;

E. invoking a tuning advisor on said section of source code resulting in optimization advice for said lines source of code; and, F. displaying said optimization advice for said section of source code.

15. The method of claim 14 wherein said tuning advisor recognizes some data type optimizations and suggests transformations to reduce instructions.

16. The method of claim 14 wherein said tuning advisor recognizes some known patterns that can cause performance problems and suggests modifications that are known to be effective in improving performance.

17. The method of claim 14 wherein said tuning advisor captures the effect of advanced optimizations performed by a compiler and proposes code modifications that would expose this effect for any compiler.

18. The method of claim 14 wherein said tuning advisor overrides a possible dependence edge and repeats step E if a dependency prevents optimizations.

19. The method of claim 14 wherein said tuning advisor overrides a compiler's conservative assumptions about safety, modifies the data for optimization and repeats step E if assumptions prevent optimizations.

20. A program tuning method comprising steps of:

A. analyzing a program with a performance analysis tool to identify critical regions in said program;

B. displaying said critical region in a graphical form;

C. displaying a text form view of a section of code corresponding to one critical region selected from among said critical regions displayed in a graphical form;

D. invoking a dis-assembler on said section of code corresponding to said one critical region resulting in lines of source code; and, E. invoking a tuning advisor on said lines of source code resulting in optimization advice for said lines of source code; and, F. displaying said optimization advice for said lines of code.

21. The method of claim 20 wherein said tuning advisor recognizes some data type optimizations and suggests transformations to reduce instructions.

22. The method of claim 20 wherein said tuning advisor recognizes some known patterns that can cause performance problems and suggests modifications that are known to be effective in improving performance.

23. The method of claim 20 wherein said tuning advisor captures the effect of advanced optimizations performed by a compiler and proposes code modifications that would expose this effect for any compiler.

24. The method of claim 20 wherein said tuning advisor overrides a possible dependence edge and repeats step E if a dependency prevents optimizations.

25. The method of claim 20 wherein said tuning advisor overrides a compiler's conservative assumptions about safety, modifies the data for optimization and repeats step E if assumptions prevent optimizations.

26. A computer implemented code optimization method comprising computer implemented steps of:

A. executing computer executable code;

B. identifying a critical region of said computer executable code; and,

C. providing optimization advice relating to said critical region of said computer executable code.

27. The method of claim 26 comprising the further computer implemented step of:

D. displaying a human readable version of said critical region of said computer executable code.

28. A computer implemented code optimization method comprising computer implemented steps of:

A. executing computer executable code;

B. identifying critical regions of said computer executable code;

C. displaying a human readable version of said critical regions of said computer executable code; and, D. providing optimization advice relating to a one critical region said critical regions of said computer executable code selected by a user.

* * * * *